United States Patent

Taguchi et al.

[11] Patent Number: 5,932,676
[45] Date of Patent: Aug. 3, 1999

[54] LIQUID COATING COMPOSITION FOR FORMING SILICON-CONTAINING COATING FILM

[75] Inventors: Satoshi Taguchi, Osaka; Yuji Yoshida; Hideki Nezu, both of Chiba, all of Japan

[73] Assignee: Sumitomo Chemical Company, Limited, Osaka, Japan

[21] Appl. No.: 08/876,517

[22] Filed: Jun. 16, 1997

[30] Foreign Application Priority Data

Jun. 17, 1996 [JP] Japan .................................. 8-155241

[51] Int. Cl.$^6$ .................................................. C08G 77/04
[52] U.S. Cl. .................................. 528/12; 528/22; 427/96; 427/387
[58] Field of Search ..................... 427/96, 387; 528/12, 528/22

[56] References Cited

U.S. PATENT DOCUMENTS

| | | | |
|---|---|---|---|
| 4,865,649 | 9/1989 | Kashiwagi et al. | 106/287.16 |
| 5,103,034 | 4/1992 | Cho et al. | 556/470 |
| 5,446,088 | 8/1995 | Haluska | 106/287.16 |
| 5,496,402 | 3/1996 | Sakamoto et al. | 106/287.16 |
| 5,540,948 | 7/1996 | Haluska | 427/96 |

FOREIGN PATENT DOCUMENTS

0245938A2  11/1987  European Pat. Off. .

*Primary Examiner*—Erma Cameron
*Attorney, Agent, or Firm*—Sughrue, Mion, Zinn, Macpeak & Seas, PLLC

[57] ABSTRACT

There is provided a liquid coating composition comprising a silicone resin and an acetal or hemi-acetal-containing solvent, which is excellent in storage stability and coating property, and useful for forming a silicon-containing coating film on the surface of a substrate useful for electronic devices, the silicon-containing coating film being satisfactorily used as interlayer insulating films, levelling films and protecting films for semiconductor devices.

9 Claims, No Drawings

LIQUID COATING COMPOSITION FOR FORMING SILICON-CONTAINING COATING FILM

The present invention relates to a liquid coating composition for forming a silicon-containing coating film.

More particularly, the present invention relates to a liquid coating composition, which is excellent in storage stability and useful for forming a silicon-containing coating film on the surface of a substrate useful for electronic devices, the silicon-containing coating film being satisfactorily used as interlayer insulating films, levelling films and protecting films for semiconductor devices and the like.

In a technology of multilayer circuit wiring which has been increasingly required in the production of VLSIs with higher and higher degrees of integration and multiplicity of functions, there is a problem such that a difference in level easily appears on a formed silicon-containing coating film, particularly when the silicon-containing coating film is formed on the surface of a substrate, which is not always flat enough and moreover provided with circuit patterns.

In order to solve the problem, a so-called SOG (spin-on-glass)is now put into practice. According to the SOG, a liquid coating composition prepared by dissolving a silicone resin such as siloxane group-carrying resins or silazane group-carrying resins in an organic solvent mainly consisting of an alcohol is applied to the substrate surface having the difference in level by a spin coating method to make the surface flat, followed by heat treatment, whereby a desired silicon-containing coating film can be formed.

However, the SOG has a problem such that the liquid coating composition is low in storage stability. More concretely speaking, in case of the composition prepared using the siloxane group-carrying resin which usually has a remaining unreacted alkoxy group in the resin chain, recondensation easily arises during storage particularly due to residual water and/or water contaminated. As a result, the molecular weight increases to result in the production of a gel-like substance, which makes the coating operation impossible at last. Also, in case of the silazane group-carrying resin, it is known that the coating property is deteriorated with the lapse of time because of conversion of the Si—N bond in the molecule into an Si—O bond, or molecular rearrangement due to residual water and/or water contaminated.

In order to solve the problem, US Pat. No. 5,540,948 proposes a co-hydrolysate-containing liquid coating composition, which can be produced by hydrolyzing two different kinds of silane compounds in a mixture of an oxygen-containing polar organic solvent, an acid and water, wherein water is used in an amount of less than a chemical equivalent. However, the proposal is not always sufficient to meet the requirement, and it is difficult to avoid contamination with water during storage, because the composition contains the polar organic solvent.

Japanese Patent Kokai (Laid-Open) No.7-118609 proposes a liquid coating composition produced by dissolving a polyorganosilyl sesquioxane in a solvent having a water content of from 0.3 to 6.5% by weight. However, the proposal is not advantageous from an industrial point of view, because it inevitably requires dehydration of the solvent to be used by distillation or the like using a complicated equipment.

The present inventors have undertaken extensive studies to improve a storage stability of this kind of liquid coating composition, which is easy to be deteriorated due to water produced during hydrolysis-condensation of alkoxysilane or the like for the production of desired silicone resins, or due to water contaminated during storage.

It is an object of the present invention to provide a liquid coating composition useful for forming a silicon-containing coating film, particularly for forming an insulation film such as interlayer insulating films, protecting films and levelling films useful for electronic devices.

It is another object of the present invention to provide a liquid coating composition for forming a silicon-containing coating film, which is superior in storage stability and coating property.

It is still another object of the present invention to provide a method for producing the aforementioned liquid coating composition industrially advantageously.

It is a further object of the present invention to provide a method for forming a silicon-containing coating film.

Other objects and advantages of the present invention will be apparent from the following description and appended claims.

In order to accomplish these objects, there is provided a liquid coating composition for forming a silicon-containing coating film, which comprises a silicone resin and a solvent comprising an acetal or hemi-acetal solvent.

The present invention is illustrated in detail as follows.

In the present invention, the term "silicone resin" is intended to mean those having an Si—O bond in the molecule as well as those having an Si—N bond.

The silicone resin usable in the present invention is not particularly limited, and can be readily prepared by hydrolysis-condensation of an alkoxysilane including tetraalkoxysilanes, as described in Japanese Patent Kokai (Laid-Open) Nos. 56-2871, 7-305028 and 7-166132 as well as Examined Japanese Patent Publication No. 8-3074, or by hydrolysis-condensation of hydrogenated or fluorinated alkoxysilanes, as described in Japanese Patent Kokai (Laid-Open) Nos. 4-216827, 7-97448, 7-97548 and 7-173434. Examples of the silicone resin usable also include those disclosed in Japanese Patent Kokai (Laid-Open) Nos. 1-203476, 5-105486 and 6-136131.

Of these, particularly preferred is a silicone resin having one or more structural units selected from those represented by the following formulas (1) and (2),

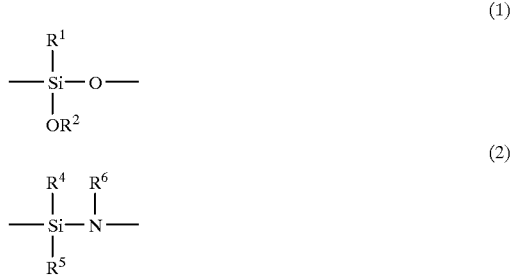

wherein $R^1$ represents a hydrogen atom, a fluorine atom, an alkyl group, an alkenyl group, an aryl group or an —$OR^3$ group; $R^2$ and $R^3$ independently each other represent a hydrogen atom, an alkyl group, an alkenyl group or an aryl group; $R^4$ and $R^5$ independently each other represent a hydrogen atom, an alkyl group, an alkenyl group, an aryl group or an —$OR^3$ group wherein $R^3$ is as defined above; and $R^6$ represent a hydrogen atom, an alkyl group, an alkenyl group or a phenyl group.

With regard to the silicone resin and undermentioned compound usable for the preparation of the silicone resin, unless otherwise indicated, the alkyl group is preferably an alkyl having 1 to 6 carbon atoms, the alkenyl group is preferably an alkenyl having 2 to 6 carbon atoms, and the aryl group is preferably a phenyl group, which is unsubstituted.

Among the silicone resins having at least one unit of the formulas(1) and (2), preferred is the silicone resin having at least one unit of the formula (1) from viewpoint of storage stability of the liquid coating composition. In other words, the liquid composition comprising the silicone resin having at least one unit of the formula (1) is more remarkable in the effect of inhibiting the change with lapse of time due to residual water and/or water contaminated.

The preferred silicone resin can be prepared by hydrolysis-condensation of a compound represented by the following formula (3):

$$Si(R^7)_{n-4}(OR^8)_n \qquad (3)$$

wherein $R^7$ represents a hydrogen atom, a fluorine atom, an alkyl group, an alkenyl group or an aryl group, and may be the same or different when n is 2 or less; $R^8$ represents an alkyl group, an alkenyl group or an aryl group, and may be the same or different when n is 2 or more; and n is an integer of 1 to 4.

More preferred is a silicone resin prepared by hydrolysis-condensation of one or more compounds represented by the following formula (4),

$$Si(R^9)_{-4}(OR^8)_{n'} \qquad (4)$$

wherein $R^9$ represents a hydrogen atom or a fluorine atom, and may be the same or different when n' is 2 or less; n' represents an integer of 1 to 3; and $R^8$ is as defined above.

It is noted that the compound of the formula (4) is known to be undesirable for the preparation of the silicone resin used in the art to which the present invention pertains, because the unreacted $OR^8$ such as alkoxy and also the hydrogen and/or fluorine atoms bonded to the silicon atom in the resulting silicone resin are easy to convert to susceptible hydroxyl groups due to water, so that the storage stability of the said resin-containing liquid coating composition is easily deteriorated.

Examples of the compound of the formula (4) include trimethoxysilane, triethoxysilane, tripropoxysilane, tributoxysilane and the like. Of these, trimethoxysilane and triethoxysilane are preferably used, because they are commercially available.

The acetal or hemi-acetal solvent used in the present invention includes, for example, 2,2-dimethoxypropane, 2,2-diethoxypropane, 2,2-dimethoxybutane, 2,2-diethoxybutane, 4,4-dimethoxy-2-butanone, 3,3-dimethoxypropionylnitrile, cyclohexanone dimethylacetal and the like. They can be used singly or in combination of two or more. Of these, 2,2-dimethoxypropane and cyclohexanone dimethylacetal are particularly preferred, because they are easily available industrially.

The solvent used in the present invention can comprise an organic solvent besides the acetal or hemi-acetal solvent as far as the effect of the present invention is not damaged.

Examples of the organic solvent include alcohols such as methanol, ethanol, isopropanol, butanol, 2-ethoxyethanol, etc.; ketones such as methyl ethyl ketone, methyl isobutyl ketone, acetyl acetone, cyclohexanone., 2-heptanone, etc.; amides such as N,N-dimethylformamide, N,N-dimethylacetamide, N-methyl-2-pyrrolidone, etc.; esters such as ethyl acetate, butyl acetate, ethyl lactate, ethyl cellosolve acetate, etc.; ethers such as dipropyl ether, dibutyl ether, tetrahydrofuran, diethoxyethane, dimethoxyethane, etc.; halogenated hydrocarbons such as dichloromethane, trichloroethane, etc.; and hydrocarbons such as hexane, heptane, cyclohexane, toluene, xylene, etc. Particularly, alcohols, ketones, esters or ethers are preferred. These can be used singly or in combination of two or more.

In the present invention, it is preferred from an industrial point of view to use a mixture of the acetal or hemi-acetal solvent and the above-mentioned organic solvent. Of the organic solvents exemplified above, preferable are those, such as alcohols, which are usable also as the solvent for the hydrolysis-condensation of the compound to obtain the silicone resin.

In case of using the mixture of the acetal or hemi-acetal solvent and the organic solvent, a content of the acetal or hemi-acetal solvent can be determined depending on the kinds and water content of the silicone resin to be used. It is usually about 1% by weight or more, preferably about 5% by weight or more, based on the total weight of the mixture as the solvent The liquid coating composition of the present invention can be readily prepared by dissolving the silicone resin in the solvent of the present invention to form a uniform solution.

In preparing the liquid coating composition, the silicone resin is used in an amount of preferably from about 3 to about 50% by weight, more preferably from about 8 to about 20% by weight, based on the weight of the liquid coating composition. When the content of the silicone resin is too small, it may be difficult to increase the film thickness of the silicon-containing coating film. On the other hand, when the content is too large, a viscosity of the liquid coating composition may increase to deteriorate the coating property.

The liquid coating composition of the present invention may further comprise additives such as antioxidant, etc. as far as the storage stability and characteristics of the silicon-containing coating film are not damaged.

The silicon-containing coating film can be formed by applying the liquid coating composition of the present invention to form a coating layer, pre-drying the coating layer to remove the solvent used and then subjecting the pre-dried layer to curing.

The application of the liquid coating composition can be performed by means of a conventional coating method such as spin coating, dipping and spraying methods. In the formation of an insulating film for electronic devices, spin coating method is particularly preferred.

The pre-drying for removal of the solvent can be performed by air-drying or heating the layer at a relatively low temperature, and the curing can be performed by heating it at a temperature of from 300 to 900° C., preferably from 400 to 500° C.

The liquid coating composition in accordance with the present invention is excellent in storage stability and coating property, and useful for forming a silicon-containing coating film with excellent film characteristics. The silicon-containing coating film formed is free from crack formation and low in shrinkage.

The present invention is illustrated in more detail with reference to the following Examples, which are only illustrative but not to be construed to limit the scope of the present invention. In Examples, % is by weight unless otherwise specified.

Examples 1 to 3 and Comparative Example 1 (Preparation of liquid coating composition)

In a three-necked flask having an internal volume of 100 ml, 10.5 g of triethoxysilane (manufactured by Shinetsu Silicone Co., Ltd.), 4.4 g of tetraethoxysilane (manufactured by Shinetsu Silicone Co., Ltd.) and 30 g of ethanol were charged, and then 4.9 g of an acetic acid-sulfuric acid solution (prepared by mixing 50 g of acetic acid with 0.1 ml of concentrated sulfuric acid) was added dropwise over about 10 minutes.

After an internal temperature was raised to 55° C., the mixture was stirred for 5 hours to obtain a solution containing an oligomer having 400 of a weight average molecular weight (in polystyrene terms) measured by GPC.

To this solution was added 0.5 ml of acetic acid, and the mixture was kept at the internal temperature of 55° C. for 2 hours. After cooling, the reaction mixture was passed through a column packed with about 15 ml of a mixed bed ion-exchange resin MB-HP (manufactured by Rohm & Haas Co.) to remove sulfuric acid and unreacted acetic acid.

To the resulting solution was added ethanol in an about three-fold amount (parts by weight), and the solvent was evaporated using an evaporator. The operation of addition of ethanol and evaporation was repeated twice to remove a reaction by-product of ethyl acetate, and thereafter, the resultant was allowed to stand in an atmosphere of room temperature for 5 days.

The resulting ethanol solution of a silicone resin was 44.5 g in yield, a resin solid content measured by a heat loss method was 9.0%, and a water content measured by Karl Fischer method (Hiranuma moisture meter, Model AQ-6) was 0.3%. An average molecular weight (in polystyrene terms) by GPC (Model HLC-8120 manufactured by Toso Co., analytical column: Shodex KF-802 manufactured by Showa Denko Co., Ltd.) was 6100.

The ethanol solution in each amount of 10 g was mixed with each solvent shown in Table 1 in each amount also shown in the following Table 1, thereby obtaining liquid coating compositions A to D having a solid content of 8%, the composition A being Comparative Example 1, and the compositions B to D being Examples 1 to 3.

Example 4 and Comparative Example 2 (Preparation of liquid coating composition)

In a three-necked flask having an internal volume of 100 ml, 10.5 g of triethoxysilane (manufactured by Shinetsu Silicone Co., Ltd.), 4.4 g of tetraethoxysilane (manufactured by Shinetsu Silicone Co., Ltd.) and 30 g of ethanol were charged, and then an aqueous sulfuric acid solution prepared by mixing 50 μl of concentrated sulfuric acid with 1.1 g of water was added.

After an internal temperature was raised to 40° C., the mixture was stirred for 5 hour. After cooling, the reaction mixture was passed through a column packed with about 15 ml of a mixed bed ion-exchange resin MB-HP (manufactured by Rohm & Haas Co.) to remove sulfuric acid.

The resulting ethanol solution of a silicone resin was 46.3 g in yield, a resin solid content was 9.0%, and a water content was 0.7%. An average molecular weight (in polystyrene terms) was 4800.

The ethanol solution in each amount of 10 g was mixed with each solvent shown in Table 1 in each amount also shown in Table 1, thereby obtaining liquid coating compositions E(Comparative) and F having a solid content of 8%.

Data relating to change of the molecular weight (abbreviated as Mw in Table 1) after a 30 day storage demonstrate that the storage stability of the liquid coating compositions B, C, D and F is superior to that of the comparative compositions A and E.

TABLE 1

| Example | | 1 | 2 | 3 | | 4 |
|---|---|---|---|---|---|---|
| Comparative Example | 1 | | | | 2 | |
| Liq. coating composition | A | B | C | D | E | F |
| Amount of ethanol added, g | 1.25 | 0.73 | 0.21 | 0 | 1.38 | 0 |
| Amount of DMP*1 added, g | 0 | 0.52 | 1.04 | 1.25 | 0 | 1.38 |
| Water content, % | 0.27 | 0.09 | 0.07 | 0.05 | 0.61 | 0.10 |
| Initial Mw | 6100 | 6100 | 6100 | 6100 | 4800 | 4800 |
| Mw after a lapse of 30 days | 9400 | 7000 | 6500 | 6300 | 10500 | 5400 |

*1DMP: 2,2-dimethoxypropane

Examples 5 to 8 (Formation of silicon-containing coating film)

The liquid coating compositions B, C, D and F obtained above were coated on the surface of a 4 inch wafer by a spin coating method using Mikasa spinner, Model 1H-360, manufactured by Mikasa Co. to form a coating layer, respectively.

The layer thickness (initial film thickness) was controlled by a revolution rate of the spinner and was measured by using a film thickness measuring device, Nanospec, Model 210, manufactured by Nanometric Co.

The resulting layer was air-dried and then subjected to curing at 450° C. for 30 minutes to form a silicon-containing coating film on the wafer.

The film formed on the wafer was visually observed whether a crack was formed or not. A maximum film thickness at which no crack was formed was determined and was taken as an index of a crack resistance. A shrinkage percent was also determined by the following equation.

Shrinkage percent(%)={(initial film thickness—film thickness after curing)/(initial film thickness)}×100

The results are shown in Table 2.

Comparative Examples 3 and 4( Formation of silicon-containing coating film)

The same procedure as in Examples 5 to 8 was repeated for the liquid coating compositions A and E obtained above. The results are also shown in Table 2.

TABLE 2

| | Example | | | | Comparative example | |
|---|---|---|---|---|---|---|
| | 1 | 2 | 3 | 4 | 1 | 2 |
| Liq. coating composition | B | C | D | F | A | E |
| Crack resistance, μm | | | | | | |
| Immediately after formation | 1.0 | 1.0 | 1.0 | 1.0 | 1.0 | 0.9 |
| 30 Days after formation | 0.8 | 1.0 | 1.1 | 1.1 | 0.8 | —*3 |
| Shrinkage percent, % | | | | | | |
| Immediately after formation | 19 | 19 | 19 | 19 | 19 | 13 |
| 30 Days after formation | 18 | 19 | 17 | 18 | 15 | —*3 |
| Coating property*2 | | | | | | |
| Immediately after preparation | ○ | ○ | ○ | ○ | Δ | × |
| 30 Days after preparation | Δ | ○ | ○ | ○ | × | ×× |

*2The coating property was determined by microscopically observing the film surface with the following criteria.
○ : Good
Δ: Unevenness is observed at the edge
×: Unevenness is wholly observed
××: Impossible to coat
*3—: Impossible to test Although the present invention has been described in connection with preferred embodiments thereof, many other variations and modifications and other uses will become apparent to those skilled in the art without departing from the scope of the invention. It is preferred, therefore, that the present invention not be limited by the specific disclosure herein, but only by the appended claims.

We claim:

1. A liquid coating composition for forming a silicon-containing film, which comprises a silicone resin and a solvent comprising an acetal or hemi-acetal solvent, wherein the silicone resin has one or more structural units selected from those represented by the formulas (1) and (2),

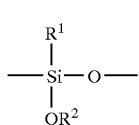

(1)

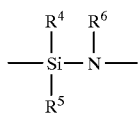

(2)

wherein $R^1$ represents a hydrogen atom, a fluorine atom, an alkyl group, an alkenyl group, an aryl group or an $—OR^3$ group; $R^2$ and $R^3$ each represent a hydrogen atom, an alkyl group, an alkenyl group or an aryl group; $R^4$ and $R^5$ each represent a hydrogen atom, an alkyl group, an alkenyl group, an aryl group or an $—OR^3$ group wherein $R^3$ is as defined above; and $R^6$ represents a hydrogen atom, an alkyl group, an alkenyl group or a phenyl group.

2. The coating composition according to claim 1, wherein the silicone resin has one or more structural units selected from those represented by the formula (1),

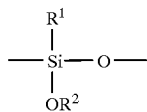

(1)

wherein $R^1$ represents a hydrogen atom, a fluorine atom, an alkyl group, an alkenyl group, an aryl group or an $—OR^3$ group; and $R^2$ and $R^3$ each represent a hydrogen atom, an alkyl group, an alkenyl group or an aryl group.

3. The coating composition according to claim 1, wherein the silicone resin is one prepared by hydrolysis-condensation of a compound represented by the formula (3), $$Si(R^7)_{4-n}(OR^8)_n \qquad (3)$$

wherein $R^7$ represents a hydrogen atom, a fluorine atom, an alkyl group, an alkenyl group or an aryl group, and may be the same or different when n is 2 or less; $R^8$ represents an alkyl group, an alkenyl group or an aryl group, and may be the same or different when n is 2 or more; and n is an integer of 1 to 4.

4. The coating composition according to claim 1, wherein the silicone resin is one prepared by hydrolysis-condensation of a compound represented by the formula (4), $$Si(R^9)_{4-n'}(OR^8)_{n'} \qquad (4)$$

wherein $R^8$ represents an alkyl group, an alkenyl group or an aryl group, and may be the same or different when n' is 2 or more; $R^9$ represents a hydrogen atom or a fluorine atom, and may be the same or different when n' is 2 or less; and n' is an integer of 1 to 3.

5. The coating composition according to claim 1, wherein the acetal or hemi-acetal solvent is 2,2-dimethoxypropane, 2,2-diethoxypropane, 2,2-dimethoxybutane, 2,2-diethoxybutane, 4,4-dimethoxy-2-butanone, 3,3-dimethoxypropionylnitrile, cyclohexanone dimethylacetal or a mixture thereof.

6. The coating composition according to claim 1, wherein the acetal or hemi-acetal solvent is 2,2-dimethoxypropane, cyclohexanone dimethylacetal or a mixture thereof.

7. The coating composition according to claim 1, wherein the solvent is a mixture of the acetal or hemi-acetal solvent and one or more organic solvents selected from alcohols, ketones, amides, esters, ethers and halogenized and unhalogenized hydrocarbons.

8. The coating composition according to claim 7, wherein a content of the acetal or hemi-acetal solvent is about 1% by weight or more based on the weight of the mixture.

9. The coating composition according to claim 1, wherein a content of the silicone resin is from about 3 to about 50% by weight based on the weight of the coating composition.

* * * * *